(12) United States Patent
Mangalore

(10) Patent No.: US 8,417,937 B2
(45) Date of Patent: Apr. 9, 2013

(54) SYSTEM AND METHOD FOR SECURELY TRANSFERING CONTENT FROM SET-TOP BOX TO PERSONAL MEDIA PLAYER

(75) Inventor: Geetha Mangalore, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 237 days.

(21) Appl. No.: 12/635,196

(22) Filed: Dec. 10, 2009

(65) Prior Publication Data

US 2011/0145562 A1  Jun. 16, 2011

(51) Int. Cl.
*H04L 29/06* (2006.01)
*H04L 9/32* (2006.01)
*G06F 7/04* (2006.01)
*G06F 15/16* (2006.01)
*G06F 17/30* (2006.01)

(52) U.S. Cl.
USPC ............... 713/151; 713/168; 726/3; 380/200; 380/279

(58) Field of Classification Search .................. None
See application file for complete search history.

(56) References Cited

U.S. PATENT DOCUMENTS

| 2002/0129245 | A1* | 9/2002 | Cassagnol et al. | 713/168 |
| 2007/0073624 | A1* | 3/2007 | Ishibashi et al. | 705/53 |
| 2008/0060055 | A1* | 3/2008 | Lau | 726/3 |
| 2009/0086978 | A1* | 4/2009 | McAvoy et al. | 380/279 |
| 2009/0136028 | A1* | 5/2009 | Card, II | 380/200 |

* cited by examiner

*Primary Examiner* — Shin-Hon Chen
(74) *Attorney, Agent, or Firm* — Thomas A. Ward

(57) ABSTRACT

A media player is provided for receiving session data from a security socket layer. The session data includes encrypted content data, a content key and digital rights data, wherein the content key and the digital rights data have been encrypted with a SSL session key. The said media player includes a first processor portion and a second processor portion. The first processor portion is arranged to receive the session data, has a second key. The first processor portion and can generate the SSL session key and can decrypt the session data with the SSL session key. The first processor portion can further re-encrypt the decrypted content key with the second key and can output the re-encrypted content key and digital rights data. The second processor portion is arranged to receive the re-encrypted content key and digital rights data. The first processor portion can further decrypt the content, and is externally inaccessible.

9 Claims, 3 Drawing Sheets

SYSTEM AND METHOD FOR SECURELY TRANSFERING CONTENT FROM SET-TOP BOX TO PERSONAL MEDIA PLAYER

BACKGROUND

The present invention generally relates to the field of secure communications encompassing encryption and decryption for controlling access and preventing unauthorized access to licensed and proprietary information.

Secure Sockets Layer (SSL) is a cryptographic protocol that provides secure communications over networks. A common implementation for SSL is Internet applications including web browsing and electronic mail. Another common application for SSL is video distribution for cable television.

SSL enables client/server applications to securely communicate across a network. SSL is designed to prevent unauthorized eavesdropping, tampering and message forgery.

SSL uses cryptographic techniques to provide secure communications between a client and a server. SSL provides (or incorporates) authentication procedures for verifying client and server identity. SSL supports unilateral authentication where only the server is authenticated or bilateral authentication wherein client and server are both authenticated.

Communication via SSL includes algorithm negotiation, certificate verification, key exchange and data transfer.

For SSL algorithm negotiation, a client requests a secure connection with a server and communicates a list of supported cryptographic algorithms to the server. The server selects the most secure cryptographic algorithm from the supplied list and communicates the selection to the client.

For SSL certificate verification, the server communicates its identification to the client in the form of a digital certificate. The digital certificate contains the server name, a trusted certificate authority (CA) and the server's public encryption key. The client then communicates with the trusted CA to confirm the identity of the server. For bilateral SSL communication, the server verifies the identity of the client via a trusted CA in a similar manner with the client communicating its digital certificate, trusted CA and public encryption key.

For SSL key exchange, the server and client exchange keys for the encryption and decryption of the data which is to be transferred. For SSL data transfer, client and server use previously exchanged encryption/decryption keys for secure transfer of data. While not impenetrable, SSL does provide a highly secure transfer of information.

Digital Rights Management (DRM) is a term referring to access control methods used by copyright holders, media distribution outlets and publishers for restricting access to digital content and devices to entities which are authorized access. The DRM associated with a particular piece of digital data may provide: a set of access rights, e.g., can the receiver of the digital data access the digital data, and if so, how many times; and a set of copy rights, e.g., can the receiver of the digital data copy the digital data, and if so, how many times. DRM is deployed in order to prevent the unauthorized viewing, copying and/or distribution of digital content.

In practice, many widely used DRM systems have been defeated or circumvented following large scale deployment. Conventional DRM systems are generally designed such that keys used for secure data exchange are made available via an unintended access point provided by a system's hardware and/or software.

Conventional hardware and software are designed to allow system designers, manufacturers and users to implement system debugging, testing, configuring and diagnostics. While these capabilities increase system efficiency, they enable unauthorized access to keys used for encrypting and decrypting digital content. Hackers can use the access points provided by hardware and software to gain unauthorized access to digital keys and content.

A conventional video distribution system provides digital video content to end users. Digital video content is communicated, for example, to a Set Top Box (STB) located at the user's premises. Hardware and software located in the STB determines whether an end user is authorized to view digital video content based on the license agreement (associated with a DRM) between the end user and the video distribution proprietor. STBs are not easily portable and reside on the end user's premises and are generally operational only when located on the premises.

A Portable Media Player (PMP) may be connected to the STB for downloading and future viewing of digital video content from the STB. A PMP may be transported to locations outside of the end user's premises. An end user may view digital video content subject to the license agreement whether or not the PMP is located at the end user's premises.

In addition to using SSL for secure communication between a STB and a PMP, digital video distribution systems encrypt and decrypt the digital video content using a specific predetermined key to unlock the content, i.e., a Content Key (CK). CKs, along with the encrypted digital video content, are communicated between STB and PMP via SSL communications.

FIG. 1 illustrates an example of a conventional video distribution system by which a user can request video for viewing and for controlling the operation of the displayed video.

A video distribution system 100 includes a STB 102, a STB user interface 104, a communications link 106, a communications system 108, a display 110, a channel 112, a PMP 114, a communications channel 116, a display 118 and a PMP user interface 120.

STB 102 communicates with communications system 108 via communications link 106. Communications link 106 provides bi-directional communication between STB 102 and communications system 108. STB 102 is able to receive control, status request, configuration and data information via communications link 106. Additionally, STB 102 is able to transmit to communications system 108 via communications link 106.

STB user interface 104 is located on the front assembly of STB 102. STB user interface 104 provides status information to users (not shown) and provides users limited ability to control STB 102.

Display 110 is connected to STB 102 via channel 112. Video information provided by STB 102 is transmitted via channel 112 to display 110 and is viewed by users.

PMP 114 is connected to STB 102 via communications channel 116. Display 118 is connected to PMP 114. Users are able to view video on display 118. Video is provided to display 118 by PMP 114. Video is provided to PMP 114 by STB 102 via communications channel 116. PMP user interface 120 is connected to PMP 114. PMP user interface 120 enables users to configure and control the operation of PMP 114. A primary function of PMP user interface 120 is to enable users to request video for viewing on display 118. PMP user interface 120 also enables users to control the video viewed on display 118. Users can use PMP user interface 120 to start, stop, pause, fast forward and rewind digital video content.

Proprietors of video delivery systems desire a secure way to deliver digital video content to their customers. Unauthorized access to keys or data can result in lost revenue for proprietors. The following discussion related to FIG. 2 will further explain conventional security measures related to conventional video delivery systems.

FIG. 2 illustrates an example of conventional secure communications between STB 102 and PMP 114. STB 102 includes a data processing and storage portion 201, a digital rights management portion 203 and a CK generating portion 205. CK generating portion 205 is operable to generate a CK 206. Digital rights management portion 203 is operable to manage digital rights of content as STB DRM 204. Data processing and storage portion 201 is operable to process and store data for use by STB 102 and PMP 114. PMP 114 includes a processing portion 207, which includes a CK receiving portion 208 and a digital rights management portion 209. Processing portion 207 is operable to process data received by STB 102. CK receiving portion 208 is operable to receive CK 206 from STB 102. Digital rights management portion 209 holds PMP DRM 210, as will be discussed in more detail below. PMP 114 is able to request and receive information from STB 102 securely via SSL 202. Unauthorized decryption of information is difficult via SSL, but possible by accessing internal electronic connections of PMP 114.

PMP 114 and STB 102 communicate bi-directionally via communications channel 116 as illustrated in FIG. 1. PMP 114 and STB 102 communicate in a secure manner via SSL 202 as illustrated in FIG. 2.

As illustrated in FIG. 2, a data 200, a STB DRM 204 and a CK 206 are located in data processing and storage portion 201, a digital rights management portion 203 and a CK generating portion 205, respectively, of STB 102. STB DRM 204 establishes rights for data 200. Such rights may dictate whether (and how often) an entity may play or copy data 200. Data 200 includes content data that is encrypted with CK 206. The encrypted content is sent to an authorized entity (upon request) with CK 206. The authorized entity may then unlock the requested content data with CK 206 in order to play and/or record the content data in compliance with the rights provided by STB DRM 204. A PMP DRM 210 is located in PMP 114.

Data and encryption keys within conventional video distributions systems, as illustrated in FIG. 1 and FIG. 2, are vulnerable to being compromised via unauthorized access. As a result of compromise, data may be used by unauthorized entities or may be used inappropriately by authorized entities; by accessing the data in an unauthorized manner during time periods in which they are not authorized to have access or by accessing more times than they are allowed per the licensing agreement.

An access point which persons commonly attempt unauthorized decryption of information being transmitted between STB 102 and PMP 114 is located on SSL 202, represented as an attack point 212. Another point in which persons commonly attempt unauthorized decryption of information being transmitted between STB 102 and PMP 114 is located at PMP 114, represented as an attack point 214.

For example, an end user or application, generates a request to obtain content from STB 102 via PMP 114.

SSL algorithm negotiation, certificate verification and key exchange are performed between STB 102 and PMP 114. A request for data 200 is transmitted from PMP 114 to STB 102 via SSL. STB 102 receives SSL encrypted request for data 200 and decrypts the request. After decryption, the request is communicated to STB DRM 204. STB DRM 204 provides digital rights management for STB 102. STB DRM 204 functions to determine whether a request meets license agreements and therefore, is to be made available to the requestor.

STB DRM 204 receives a request for data 200. If STB DRM 204 deems end user's request is valid, then STB DRM 204 encrypts data 200 using CK 206 and then provides CK 206 and the encrypted version of data 200 to PMP 114 via SSL 202. The encrypted version of data 200 from STB DRM 204 includes digital rights, which may dictate whether data 200 may be copied (by what and how often) or played (by what, when, and how often).

PMP DRM 210 receives CK 206 and data 200 transmitted by STB 102 via SSL 202. PMP DRM 210 uses the copy of CK 206 from within CK receiving portion 208 to decrypt data 200. PMP DRM 210 parses the content of data 200 to determine its type and function. PMP DRM 210 functions to determine whether a request for data meets license agreements and is to be made available. If PMP DRM 210 deems a request is valid, then PMP DRM 210 provides data 200 to end user.

Attempting to gain unauthorized access to information transmitted between STB 102 and PMP 114 is very difficult as SSL provides a high level of security protection. However, as briefly mentioned above, unauthorized access to information transmitted between STB 102 and PMP 114 with conventional systems is possible by gaining access to internal electronic connections of PMP 114 and through observation of unencrypted information on the internal electronic connections.

Such unauthorized access to keys and data will now be described with reference to FIG. 3.

FIG. 3 illustrates an example of a conventional hardware design and configuration for PMP 114. PMP 114 includes a processor portion 300, a processor portion 302 and a display 304.

Processor portion 300 is arranged to receive SSL session data from SSL 202 by way of a communication line 306. The SSL session data for PMP 114 includes includes encrypted content requested by PMP 114, keys (to decrypt the content) and digital rights. Processor portion 302 is arranged to receive unencrypted data from processor portion 300 by way of a communication channel 308. Processor portion 302 is operable to process the data for delivery to display 304 via communication channel 310.

SSL 202 securely delivers the SSL session data to PMP 114. However, for conventional PMP 114, unauthorized access can be gained to unencrypted and decrypted data and keys once the SSL session data is delivered to processor portion. In particular, once the SSL session data is delivered to processor portion 300, a person may successfully hack into processor portion 300 to obtain the encryption keys, content or digital rights.

The unauthorized content and encryption keys can then be used, enabling unauthorized viewing of video on PMP 114. Additionally, unauthorized access to encryption keys can facilitate the unauthorized viewing of video on PMPs other than PMP 114.

What is needed is a system and method for preventing unauthorized access to data and keys located on a PMP.

BRIEF SUMMARY

The present invention provides a system and method for preventing the unauthorized access to data and keys located on a PMP.

An aspect of the present invention provides a media player that can receive session data from a security socket layer. The session data includes encrypted content data, a content key and digital rights data, wherein the content key and the digital rights data have been encrypted with a SSL session key. The said media player includes a first processor portion and a second processor portion. The first processor portion is arranged to receive the session data, has a second key. The first processor portion and can generate the SSL session key and can decrypt the session data with the SSL session key. The first processor portion can further re-encrypt the decrypted content key with the second key and can output the re-encrypted content key and digital rights data. The second processor portion is arranged to receive the re-encrypted content key and digital rights data. The first processor portion can further decrypt the content, and is externally inaccessible.

Additional advantages and novel features of the invention are set forth in part in the description which follows, and in part will become apparent to those skilled in the art upon examination of the following or may be learned by practice of the invention. Advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

In accordance with an aspect of the present invention, a system and method of secure communication is provided between a STB and PMP, while preventing unauthorized access to data and to security keys for encrypting and decrypting the data at the PMP.

Aspects of the present invention provide SSL session data processing at the PMP in a manner such that the security keys are not externally accessible. Encryption and decryption is performed solely within a secure processor portion of the PMP which is not externally accessible.

Additionally, each PMP uses a unique security key for encryption and decryption of security keys communicated thereto by a STB. A PMP's unique security key cannot be used by another PMP. This will reduce the likelihood of improper transfer of digital rights to other PMPs.

In general, a PMP may request content from a STB. The STB will wrap the requested content in an encrypted package together with predetermined data rights. The STB then transmits the encrypted requested content and additionally sends a content key and the digital access rights by way of SSL to the PMP. The content key is eventually used by the PMP to decrypt the encrypted requested content. As mentioned above, digital access rights outline the PMP's authority of perform certain functions, e.g., can the receiver of the digital data access the digital data, and if so, how many times; and a set of copy rights, e.g., can the receiver of the digital data copy the digital data, and if so, how many times.

In accordance with an aspect of the present invention, the PMP will include a secure portion and an unsecure portion. The wrapped requested content delivered by the SSL is dropped into the secure portion of the PMP. This secure portion of the PMP is externally inaccessible. At this point the encrypted content key and digital access rights are decrypted. The content key is re-encrypted and the digital access rights are signed. Signing of the digital access rights enable future verification that the rules were originally provided by the STB. The re-encrypted content key and signed digital access rights are then provided to the unsecure portion of the PMP. The unsecure portion of the PMP will then store the encrypted content key and signed digital access rights in persistent non secure memory. When playback is requested the encrypted content key and signed digital access rights are passed to the secure portion for rights verification and content decryption The re-encrypted content key is decrypted inside the secure portion using the device unique key, De[CK]KEK and content is decrypted inside the secure portion and passed to the player. Thus, the original content and encryption keys will not be compromised as they remain within the secure portion.

Aspects of the present invention will now be described in greater detail with reference to FIGS. 4-6.

Figure 4:
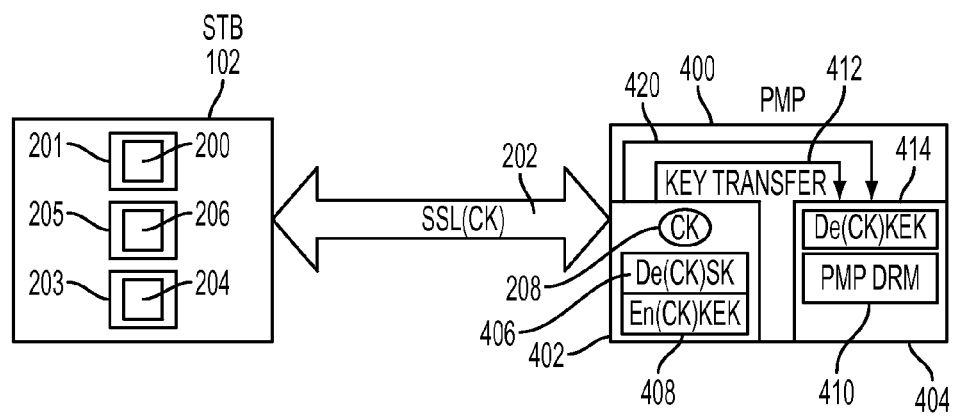
FIG. 4 illustrates, in further detail, an example of secure communications between a STB and a PMP in accordance with an aspect of the present invention.

FIG. 4 illustrates secure communications between STB 102 and an example PMP 400 in accordance with an aspect of the present invention.

Figure 1:
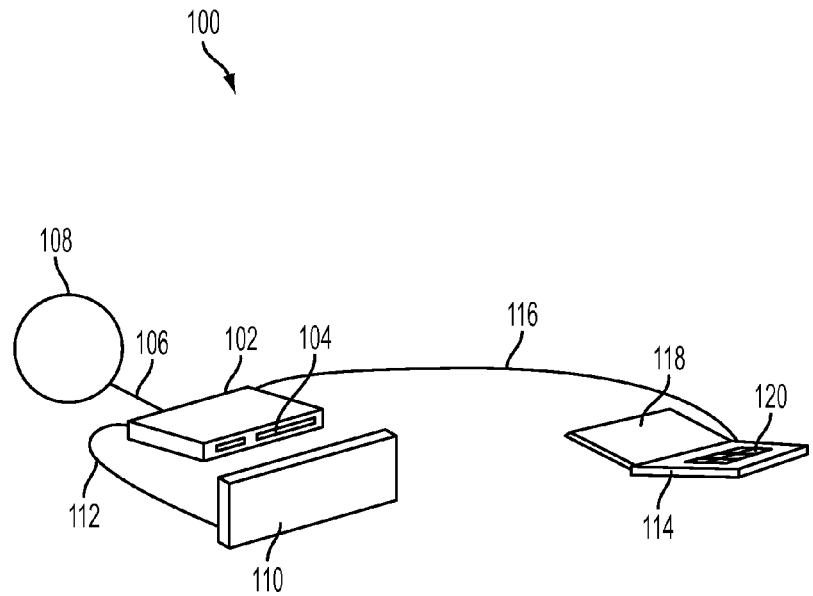
FIG. 1 illustrates a conventional video distribution system.
Figure 2:
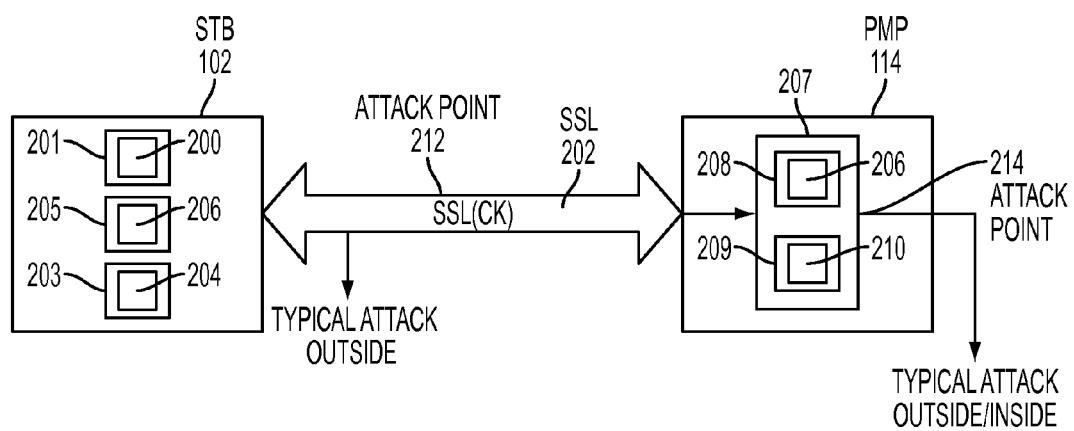
FIG. 2 illustrates, in further detail, conventional secure communications between a STB and a PMP.
Figure 3:
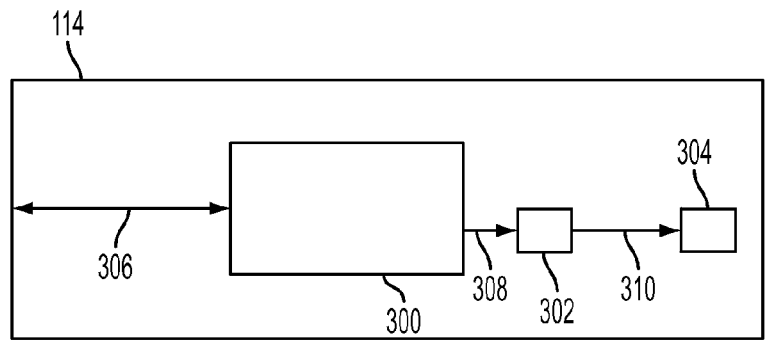
FIG. 3 illustrates a conventional hardware design and configuration of a PMP.

The communications system of FIG. 4 differs from that of FIG. 2 (discussed above) in that conventional PMP 114 of FIG. 2 has been replaced with a PMP 400. PMP 400 includes two processing portions: a secure processor portion 402 and a less secure processor portion 404.

Secure processor portion 402 includes a secure memory therein and is arranged to receive the SSL session data from SSL 202. Less secure processor portion 404 includes a persistent non secure memory therein and is arranged to receive re-encrypted data from secure processor portion 402. Secure processor portion 402 is operable to obtain a Decrypted Content Key (De(CK)SK) 406 from the SSL session data with a SSL session Key generated inside secure processor portion 402. Further, secure processor portion 402 is operable re-encrypt decrypted content key and sign the decrypted digital access rights with a device Key Encryption Key (En(CK) KEK) 408. To assist in understanding these various keys, consider that: the designation "De" corresponds to a content key that has been decrypted; the designation "En" corresponds to a content key that has been encrypted; the designation "SK" corresponds to a SSL session key of SSL 202 performing some function (either encrypting or decrypting); and the designation "KEK" corresponds to the KEK (Key Encryption Key) of secure processor portion 402 performing some function (either encrypting or decrypting). Accordingly, De(CK)SK 406 is a content key that has been decrypted using key provided by the SSL session. En(CK)KEK 408 is a content key that has been encrypted using a key provided by secure processor portion 402.

Less secure processor portion 404 includes a PMP DRM 410. Secure processor portion 402 is arranged to communicate with less secure processor portion 404 by way of channel 412.

Secure processor portion 402 provides secure processing of data and keys. Internal registers, memory and operation of secure processor portion 402 are not externally visible. De(CK)SK 406, located in secure processor portion 402, decrypts SSL information using an SSL session key. The content key is then obtained and re-encrypted using En(CK)

KEK 408. The digital access rights are signed using KEK. The re-encrypted data is then sent to PMP DRM 410 of less secure processor portion 404 by way of channel 412. At this point a decrypting key encryption key (De(CK)KEK) 414 is used to decrypt the re-encrypted data in secure processor portion 402. De(CK)KEK 414 is unique to PMP 400 and will only function correctly when used by PMP 400. De(CK)KEK 414 cannot be used for other PMPs and KEKs for other PMPs cannot be used for PMP 400.

Less secure processor portion 404 provides processing in which it is possible for its registers, memory and internal operations to be observed externally. PMP DRM 410, located in less secure processor, performs digital rights management. PMP DRM 410 determines whether requested data meets licensing agreements and whether it is acceptable to deliver requested data to end user or application.

Secure processor portion 402 receives secure information via SSL 202. Secure processor portion 402 decrypts the received SSL information in a secure manner. Functions performed inside of secure processor portion 402 are not visible via external test access points or via busses connected to external memory. The processor and memory located in secure processor are wholly contained within secure processor portion 402. The functions of secure processor portion 402, including its operational codes, and the contents of the memory are not externally accessible.

FIG. 4 illustrates an aspect of the present invention whereby data and keys are securely transmitted from STB to PMP. After transmittal of data and keys to PMP, the unencrypted keys, which are decrypted by PMP, are inaccessible from the environment outside of PMP. Additionally, each PMP has a unique encryption key for encrypting all received keys which are to be stored in less secure memory. The encrypted keys stored in less secure memory are unique to each PMP and can only be used by the PMP which encrypted the key. Aspects for the present invention prevent unauthorized access to unencrypted keys located on the PMP. Aspects of the present invention also prevent unauthorized use of a key obtained from one PMP on a different PMP.

Figure 5:
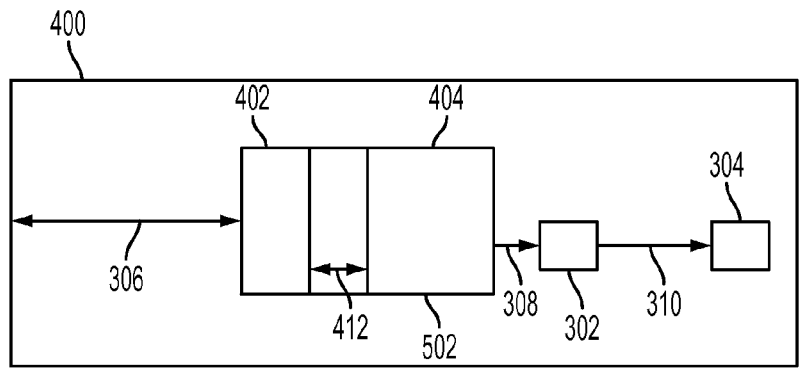
FIG. 5 shows an aspect for an example of the present invention illustrating the hardware design and configuration of a PMP assembly which prevents unauthorized access to unencrypted keys.

FIG. 4 illustrates a hi-level functional concept for an aspect of the present invention, and FIG. 5 illustrates an aspect of the present invention in a more detailed manner.

FIG. 5 illustrates an example implementation of PMP 400 of FIG. 4.

PMP 400 includes a processor portion 502, processor portion 302 and display 304. Processor portion 502 includes less secure portion 404 and secure portion 402. Secure portion 402 is arranged to communicate with less secure portion 404 by way of channel 410.

Secure processor portion 402 is arranged to receive SSL session data from SSL 202 by way of a communication line 306. Secure processor portion 402 decrypts the SSL session data and re-encrypts the content key and signs the digital access rights. The re-encrypted content key and signed digital access rights is then provided to less secure portion 404 by way of channel 410. Less secure portion 404 saves therein encrypted content key and digital access rights in non secure persistent storage. During playback rights are verified in secure processor portion 402 and content is decrypted inside secure processor portion 402. Processor portion 302 is arranged to receive the decrypted data from processor portion 300 by way of a communication channel 308. Processor portion 302 is operable to processes the data for delivery to display 304 via communication channel 310.

The operation of secure processor portion 402 is not externally accessible. As such, no unencrypted keys are externally communicated from secure processor portion 402. The key encryption provided by secure processor portion 402 is unique to secure processor portion 402. As a result, a different PMP, other than PMP 400, cannot use keys which are encrypted by secure processor portion 402. This encryption method prevents the use of keys, generated by PMP 400, on other PMPs.

An example method for providing secure communications between a STB and a PMP in accordance with an aspect of the present invention will now be described with reference to FIG. 4 through FIG. 6.

Figure 6:
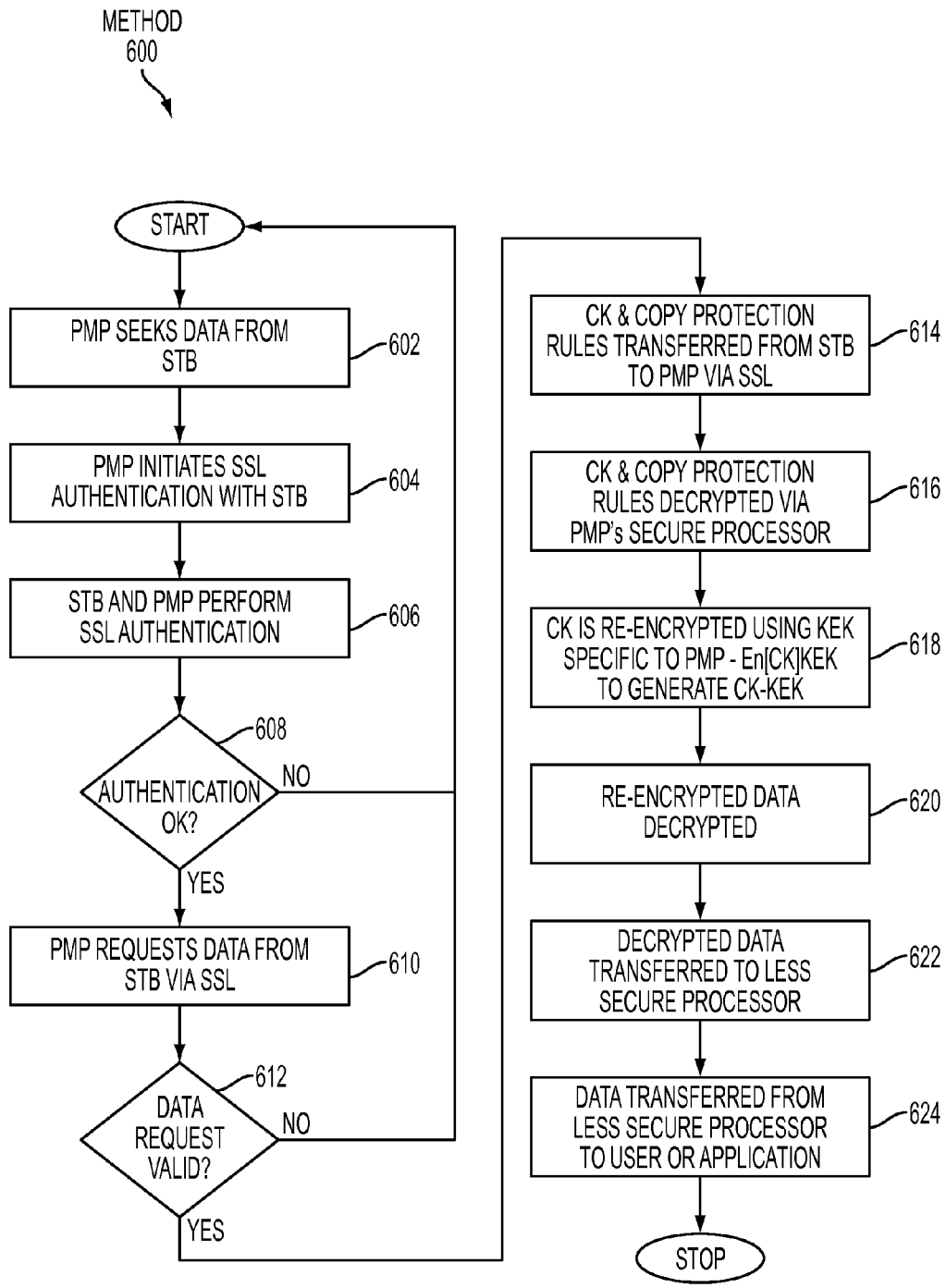
FIG. 6 illustrates a method in which an STB can securely provide data to a PMP in accordance with an aspect of the present invention.

FIG. 6 illustrates an example method 600 in which STB 102 can securely provide data to PMP 400 in accordance with an aspect of the present invention.

As illustrated in the figure, method 600 starts when PMP 400 seeks data from STB 102 (S602). For purposes of explanation, assume a user seeks to download a movie from STB 102 for viewing on PMP 400. Here, user would operate PMP 400 to request the content (the movie) from STB 102.

Then PMP 400 initiates SSL authentication with STB 102 (S604). Returning to FIG. 4, PMP 400 initiates a request to securely transfer data 200 between PMP 400 and STB 102 via SSL 202.

Then PMP 400 and STB 102 perform SSL authentication (S606). For SSL authentication, STB 102 and PMP 400 communicate with each other to verify data 200 can be transferred via SSL 202 as illustrated in FIG. 4.

At this point a determination is made as to whether the terms for SSL authentication have been satisfied (S608). In the event the terms for SSL authentication have not been satisfactorily been met, then method 600 starts again.

In the event the terms for SSL authentication have been satisfactorily been met, then as illustrated in FIG. 4, PMP 400 requests data 200 from STB 102 via SSL 202 (S610).

Then STB DRM 204 verifies that the request by PMP 400 for data 200 satisfies the license agreement between STB 102 and PMP 400 (S612). In the event STB DRM 204 determines the request by PMP 400 for data 200 does not meet the licensing agreement between STB 102 and PMP 400, then method 600 starts again.

In the event STB DRM 204 determines the request by PMP 400 for data 200 meets the licensing agreement between STB 102 and PMP 400, then copy protection digital access rights and CK 206 are transferred from STB 102 to PMP 400 via SSL 202 (S614).

Then copy protection digital access rights and CK 206 are decrypted using De(CK)SK 406 at secure processor portion 402 of PMP 400 (S616). De(CK)SK 406 decrypts the copy protection digital access rights and CK 206 using the SSL session key.

Then CK 206 is re-encrypted into En(CK)KEK 408 at secure processor portion 402 of PMP 400 (S618) and digital access rights signed with KEK. It should be noted that En(CK)KEK 408 is unique to PMP 400 and cannot be used by other PMPs.

Then En(CK)KEK 408 and signed digital access rights are transferred to PMP DRM 410 by way of channel 412 to save it in non secure persistent memory (S620).

PMP DRM 410 then passes the rights object that has the re-encrypted content key and signed digital access rights to secure processor. The secure processor decrypts content key En(CK)KEK 408 with De(CK)KEK 414 (S622) to generate CK 206 and decrypt content inside secure processor portion 402.

At this point, data 200 is transferred from less secure processor portion 404 to processor portion 302.

Processor portion 302 then processes data 200 and provides the data to display 304 for display (S624) and the process ends.

FIG. 6 illustrates an example method of securely transferring data from an STB to a PMP. To complete the secure data transfer, SSL should be initiated and authenticated. Licenses are authenticated by DRMs located on STB and PMP. Keys and digital access rights are transferred and securely decrypted. Keys are re-encrypted with a key unique to PMP. The unique PMP key cannot be used for other PMPs. Data is received and securely decrypted via SSL. Stored re-encrypted keys are retrieved and decrypted for securely decrypting received data. Decrypted content is then transferred to user or application.

In example embodiments discussed above, a STB is able to provide a secure transfer of data to a PMP while preventing unauthorized access to data and keys. Aspects of the present invention are no limited to implementation between a STB and a PMP. It should be noted that aspects of the present invention may be utilized for communication between any two devices that may communicate using SSL.

In example embodiments discussed above, a PMP includes a secure portion and a less secure portion. In some embodiments, the secure portion and the less secure portion are distinct devices, e.g., two different processors. In other embodiments, the secure portion and the less secure portion are distinct devices, e.g., a single processor having two processing portion.

In some embodiments, accordance with aspects of the present invention, the secure portion may be isolated from the less secure portion by physical mechanisms, non-limiting examples of which include providing separate hardware. In other embodiments, accordance with aspects of the present invention, the secure portion may be isolated from the less secure portion by software mechanisms, non-limiting examples of which include software obfuscation.

In the example embodiments discussed above, a STB provides data directly to a PMP. However, in some embodiments in accordance with aspects of the present invention, data provided by STB is transcoded before it is received by PMP. For example, there may be situations where the data provided by STB is of a high resolution, whereas the PMP is only operable to display data of a much lower resolution. In such situations, a transcoder may receive the high resolution data from the STB, transcode the data to the lower resolution that is readable by the PMP and then transmit the transcoded data to the PMP. Any known system and method for transcoded data may be used in accordance with aspects of the present invention.

Aspects of the present invention provide a secure transfer of data from a server to a client while preventing unauthorized access to data and keys. Unencrypted keys for decrypting encrypted data are never exposed in such a way as to be observed externally. Unencrypted keys are only made available to a secure processor and memory and the internal operation of the secure processor and memory are not externally accessible. Each client has a unique key for encrypting keys. Each unique key used for key encryption can only be used for its designated client. The unique key prevents keys obtained from one client from being used on a totally different client, thereby preventing unauthorized access to security keys.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A media player operable to receive session data through a security socket layer (SSL) from a separate set top box, the session data including encrypted content data, a content key and digital rights data, the content key and the digital rights data having been encrypted with a SSL session key, said media player comprising:
   a first processor portion arranged to receive the session data in the media player from the separate set top box, having a second key and operable to generate the SSL session key and to decrypt the session data with the SSL session key, to re-encrypt the decrypted content key with the second key and to output the re-encrypted content key and digital rights data; and
   a second processor portion arranged to receive the re-encrypted content key and digital rights data in the media player,
   wherein said first processor portion is operable to decrypt the content, and
   wherein said first processor portion is externally inaccessible.

2. The media player of claim 1, wherein said second processor portion is less secure than the first processor portion, and the second portion includes a digital rights management portion operable to store the digital rights data in an unsecure memory accessible by components that cannot access the first processor portion.

3. The media player of claim 2, wherein said first processor portion is operable to decrypt the content based on a request from said second processor portion.

4. The media player of claim 1, further comprising:
   a memory in communication with said first processor portion and said second processor portion, said memory being operable to store data therein; and
   an output device operable to play the content data subject to the digital rights data,
   wherein said memory is operable to store the re-encrypted content key and digital rights data, and wherein the memory is accessible by components that cannot access the first processor portion.

5. The media player of claim 1, wherein said first processor portion and said second processor portion are a unitary device contained within the media player separate from the set top box.

6. The media player of claim 1, wherein said first processor portion and said second processor portion are distinct devices contained within the media player separate from the set top box.

7. A method of processing media data in a media player, said method comprising:
   receiving in the media player from a separate video content providing device, by way of a first processor portion, session data from a security socket layer, the session data including encrypted content data, a content key and digital rights data, the content key and the digital rights data having been encrypted with a SSL session key;
   decrypting, by way of the first processor portion, the session data with the SSL session key;

re-encrypting, by way of the first processor portion, the decrypted content key with a second key;

providing the re-encrypted content key and digital rights data to a second processor portion in the media player;

requesting, by way of the second processor portion, the first processor portion to decrypt the content; and decrypting, by way of the first processor portion, the content.

8. The method of claim 7, wherein said receiving, by way of a first processor portion, session data from a security socket layer comprises storing the digital rights data in a digital rights management portion of the first processor portion, wherein the digital rights management portion is accessible by components that cannot access the first processor portion.

9. The method of claim 7, wherein the first processor portion and the second processor portion are a unitary device contained within the media player separate from the video content providing device.

* * * * *